United States Patent [19]

Keller et al.

[11] 4,183,189
[45] Jan. 15, 1980

[54] FLANGE CONNECTOR

[75] Inventors: Cecil T. Keller; Robert J. von Bose, both of Arlington, Tex.

[73] Assignee: Oil States Rubber Company, Arlington, Tex.

[21] Appl. No.: 900,882

[22] Filed: Apr. 28, 1978

[51] Int. Cl.² ............................................. E04H 12/00
[52] U.S. Cl. ..................................... 52/637; 403/338; 285/406; 285/DIG. 13
[58] Field of Search ......................... 52/637; 403/338; 285/364, 406, DIG. 21, DIG. 13, 420

[56] References Cited
U.S. PATENT DOCUMENTS

| | | | |
|---|---|---|---|
| 3,165,341 | 1/1965 | Burns et al. | 403/338 X |
| 3,830,533 | 8/1974 | Mezei et al. | 285/364 |
| 4,014,567 | 3/1977 | Arnold et al. | 285/DIG. 21 X |

Primary Examiner—Carl D. Friedman
Attorney, Agent, or Firm—Gerald G. Crutsinger; Harry C. Post, III

[57] ABSTRACT

An improved flange connector construction for remote actuation to connect flanges on prefabricated sections of an offshore drilling platform support structure. A flange on the end of a first prefabricated section has a downwardly extending annular skirt which supports a plurality of clamp dogs spaced about the inner circumference of the skirt. Each clamp dog is moveable in a direction generally parallel to the longitudinal axis of the annular skirt and is rotatable between a first retracted position generally tangent to the skirt and a second extended position generally radial of the skirt. The first prefabricated section is moveable to telescopically receive a flange on a second prefabricated section in the annular skirt on the first prefabricated section. After the flange on the second prefabricated section is positioned inside the skirt on the first prefabricated section, the dogs are remotely actuatable by a drive motor secured to the first prefabricated section and connected in driving relation with a ring gear which is drivingly connected to rotate externally threaded drive shafts through torque limiting clutches. Each of the clamp dogs is secured to one of the drive shafts such that the clamp dogs are individually tightened to a predetermined torque to clampingly secure the flange on the second prefabricated section to the end of the first prefabricated section. A plurality of female flange connectors are secured to one end of the main legs of the first prefabricated section and adapted to engage a plurality of male flanges secured on the ends of mating main legs in the second prefabricated section.

7 Claims, 7 Drawing Figures

FLANGE CONNECTOR

BACKGROUND OF INVENTION

Offshore drilling platforms are generally supported by towers constructed of prefabricated secured together. The offshore drilling platform support structure generally comprises a base section which is anchored by pilings to the ocean floor. It is often necessary to sequentially secure prefabricated sections together below the surface of water for assemblying the platform support structure at the offshore drilling site.

A typical support structure has a plurality of main leg sections comprising pipe having an inside diameter of six to seven feet and each prefabricated section of the structure may weigh for example, three million pounds.

Typical connectors heretofore devised for securing tubular members together are disclosed in the following U.S. Pat. Nos. 3,251,611; 3,273,915; 3,353,847; 3,427,048; 3,485,051; 3,929,355; and 4,026,227. Such devices have generally required extremely accurate and consequently expensive machining operations for forming mating sections in the coupling apparatus. In addition, such structures have required precise positioning of the sections of the coupling in relation to each other for securing sections of the connectors together. Further, such devices are generally suitable for connecting a single piece of tubing to another single piece of tubing. The devices are not particularly adapted to making a plurality of connections between ends of members which may or may not lie in a common plane.

In view of the massive size and weight of prefabricated sections of offshore drilling platform support structure which must supported by floating ships or barges while being lowered into position several hundred feet below the water surface, the assembly of an offshore drilling platform support structure has, heretofore, been very expensive and time consuming. Connectors of the type disclosed in the patents referred to above have not been particularly suited for platform assembly.

SUMMARY OF INVENTION

The improved connector construction described herein is particularly adapted for securing main legs of prefabricated offshore drilling platform support structures together. However, as will become apparent, the connector structure may be employed for coupling other members together.

The coupling structure generally comprises a plurality of flanges secured to a plurality of main legs of first and second prefabricated sections in combination with a clamping mechanism devised to secure the flanges together.

The clamping mechanism comprises one or more remotely controlled hydraulically actuated drive motors, each of the drive motors being drivingly connected to a ring gear for simultaneous actuation of a plurality of clamp dogs spaced about the inner circumference of an annular skirt secured to the flange of a first on the prefabricated sections. The ring gear is mounted in driving relation with a plurality of pinion gears which drive through torque limiting clutches to rotate an externally threaded drive shaft which extends through an internally threaded passage in each of the clamp dogs.

Power is transmitted from the remotely controlled motors through the ring gear and the torque limiting clutches for, first rotating the clamp dogs relative to a flange on a second of the prefabricated sections for positioning the clamp dogs to engage the flange on the second prefabricated section and for, second, moving each of the dogs longitudinally through the annular skirt to engage the flange on the second prefabricated section.

Since each of the clamp dogs is individually tightened to a predetermined torque, it is not necessary to perform certain grinding and machining operations, heretofore required, to assure that flanges on the first and second prefabricated sections will be secured together.

Further, because of the uneven ocean bottom the main legs of the second prefabricated section do not necessarily lie in a common horizontal plane. The torque limiting clutches independently connect a plurality of connectors on the legs of the first prefabricated section to the legs of the second prefabricated section even though surfaces may be slightly out of position.

The primary object of the invention is to provide a flange connector particulary adapted for simultaneously securing a plurality of main legs of prefabricated sections of an offshore drilling platform support structure together for assembly of the support structure at a drilling site under water.

Another object of the invention is to provide a flange connector comprising a plurality of clamping dogs moveable to engage a flange, each of the clamping dogs being driven through a torque limiting clutch such that each of the clamping dogs is independently tightened against a flange regardless of the shape and configuration of the surface of the flange.

A further object of the invention is to provide a flange connector comprising a plurality of clamping dogs, each of the dogs being locked in a retracted position and spring-urged toward a clamping position to permit independent actuation of each of the clamping dogs such that malfunction of any one or more of the clamping dogs will not effect the actuation and function of the other clamping dogs.

Other and further objects of the invention will become apparent upon referring to the detailed description hereinafter following and to the drawings annexed hereto.

DESCRIPTION OF DRAWING

Drawings of a preferred embodiment of the invention are annexed hereto, so that the invention may be better and more fully understood, in which.

Numeral references are employed to designate like parts throughout the various figures of the drawing.

DESCRIPTION OF A PREFERRED EMBODIMENT

Figure 1:
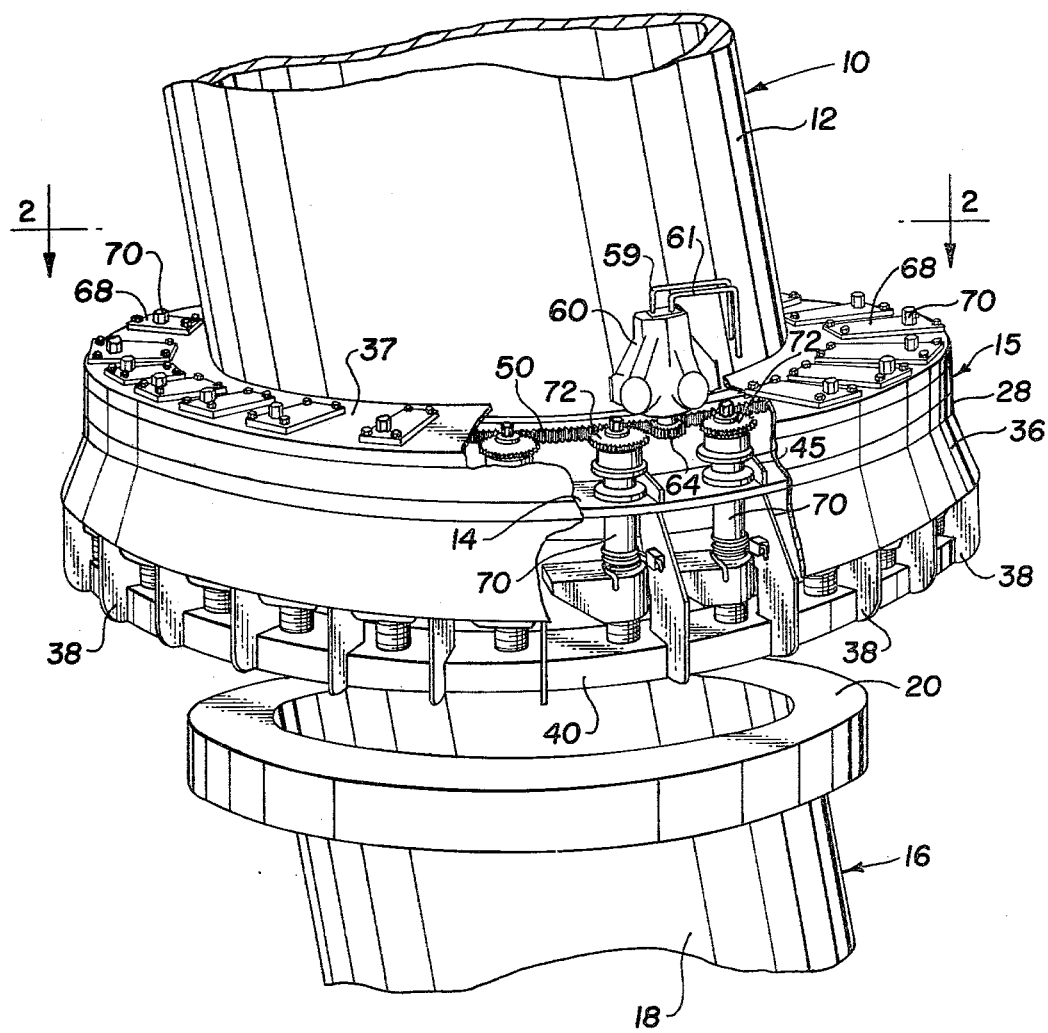
FIG. 1 is an exploded perspective view, parts being broken away to more clearly illustrate details of construction, of the flange connector for securing first and second prefabricated sections of an offshore drilling platform together.

Referring to FIGS. 1, 2, 3 and 6 of the drawing, the numeral 10 generally designates a portion of a first prefabricated section of an offshore drilling platform support structure, for example of the type disclosed in U.S. Pat. No. 3,641,774 and U.S. Pat. No. Re. 29,413.

Figure 6:
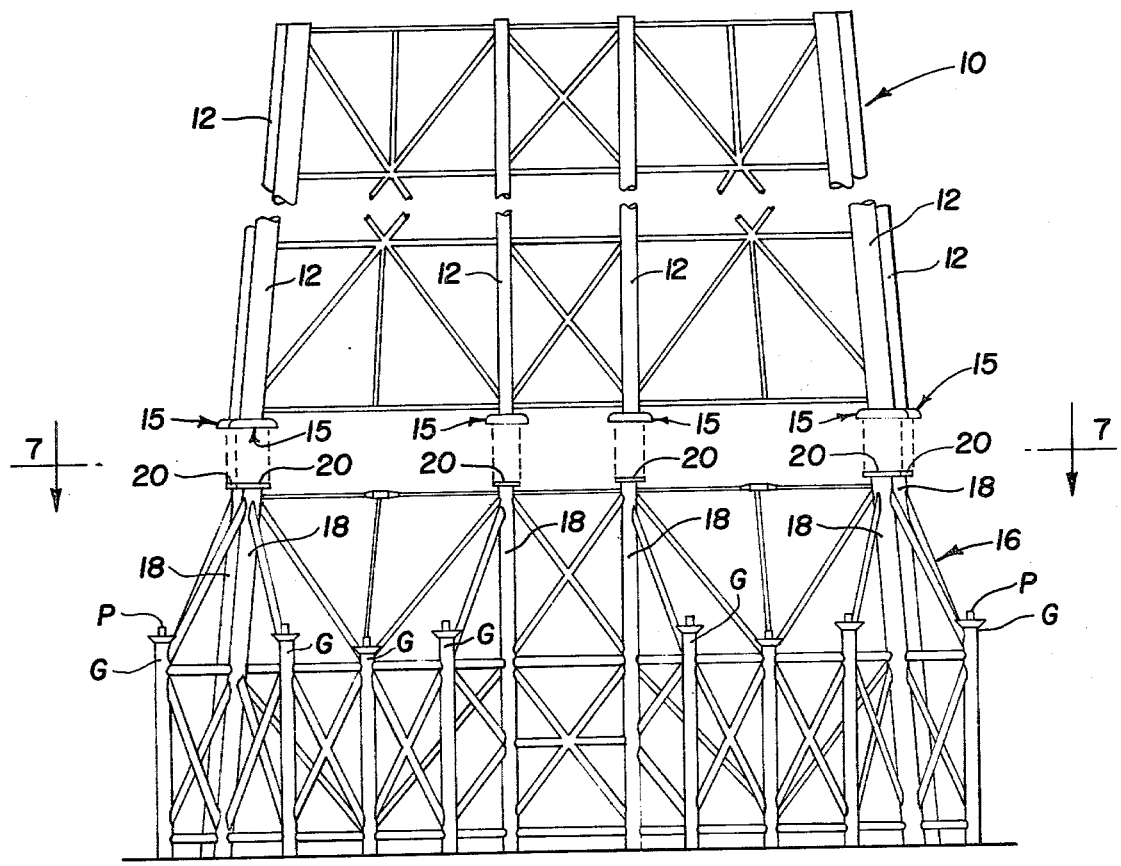
FIG. 6 is an exploded elevational view of the first and second prefabricated sections of the drilling platform with parts broken away to more clearly illustrate the details of construction.

For purposes of illustration, only one hollow tubular main leg 12 of the prefabricated section 10 is illustrated in FIG. 1 of the drawing. However, it should be appreciated that the prefabricated section 10 will generally include three or more legs which may extend vertically as disclosed and U.S. Pat. No. Re. 29,413 or legs 12 may be slightly inclined as illustrated in FIGS. 1 and 6. If the legs are inclined relative to a vertical line as illustrated in FIGS. 1 and 6, each section of the prefabricated support structure above the base section which rests on the ocean floor will be progressively smaller than the lower sections to form a support structure having a tapered or pyramid shaped configuration.

Figure 3:
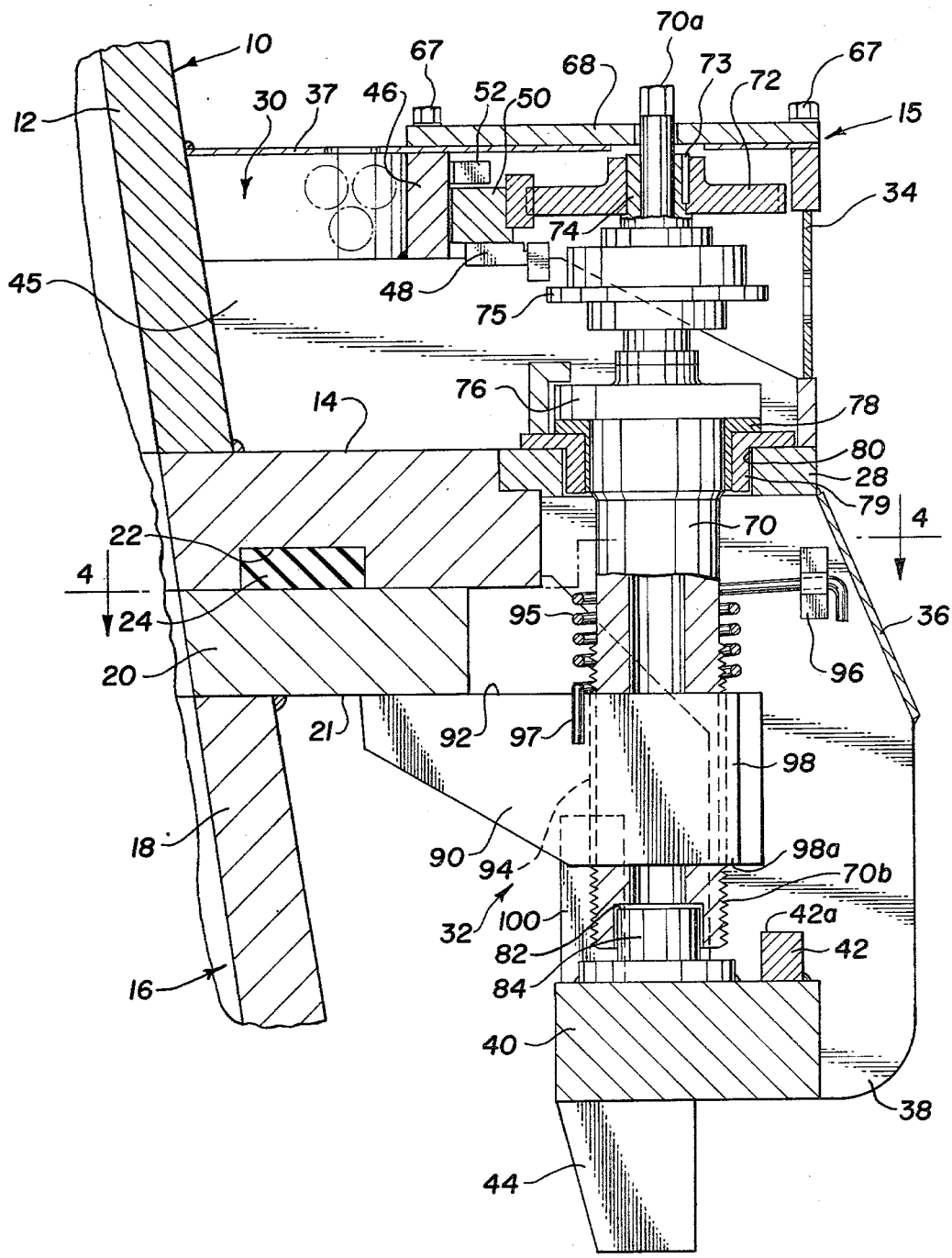
FIG. 3 is an enlarged cross-sectional view taken along line 3—3 of FIG. 2.

As best illustrated in FIGS. 1 and 3, the hollow tubular main leg 12 of the first prefabricated section 10 has a flange 14 welded or otherwise rigidly secured thereto and a female connector portion, generally designated by numeral 15, is secured to flange 14.

The second prefabricated section 16 of the drilling platform support structure illustrated in FIGS. 1, 3 and 6 includes a hollow tubular main leg 18 having a flange 20 secured to the end thereof which forms a male connector portion of the flange connector.

A least one of the flanges 14 or 20 preferably has a groove 22 formed therein to receive a mating flange seal 24 constructed of any suitable deformable resilient material, such as urethane for forming a seal between adjacent surfaces of flanges 14 and 20 when positioned as illustrated in FIG. 3.

A bearing ring 28 extends outwardly from flange 14 on main leg 12 for supporting female connector portion 15 of the flange connector.

The female portion 15 of the flange connector comprises an annular skirt portion, flange 14 and bearing ring 28 dividing the skirt portion into an upper closure portion 30 and a lower downwardly extending socket portion 32.

The skirt portion of female connector portion 15 comprises a cylindrical outer sidewall 34 welded or otherwise secured to the upper surface of bearing ring 28, a downwardly depending apron 36 having an upper end welded or otherwise secured to a lower surface of bearing ring 28 and a cover plate 37 secured to the upper end of sidewall 34 and welded or otherwise secured to main leg 12 at a position spaced from flange 14 to form an annular housing 30.

A plurality of ring gussetts 38 are secured to and extend downwardly from the outer periphery of flange 14 and the lower surface of bearing ring 28. As best illustrated in FIG. 3, apron 36 is secured to spaced gussetts 38 to form a stabilizing member and to form a protective shroud around clamping dogs, as will be hereinafter more fully explained.

Figure 4:
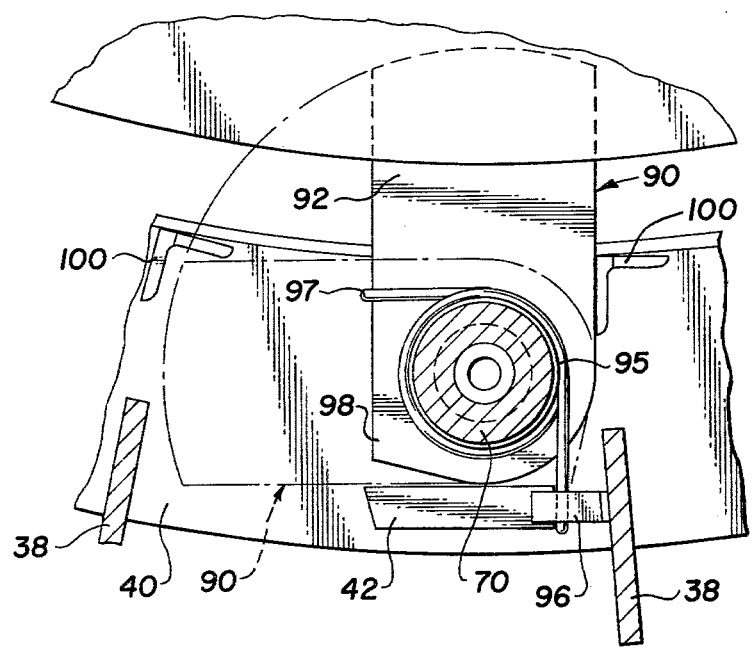
FIG. 4 is an enlarged cross-sectional view taken along line 4—4 of FIG. 3.

Ring gussetts 38 are further stabilized by a stiffener ring 40 welded or otherwise secured to the lower end thereof. Stiffener ring 40 has spaced anti-rotation stop members 42 secured to the upper surface thereof as best illustrated in FIGS. 3 and 4 of the drawing, stop members 42 being omitted from FIG. 1 of the drawing for purposes of clarity. Guide fins 44 are spaced about the central opening formed in stiffener ring 40 for guiding flange 20 on main leg 18 into the socket portion 32 of the female connector 15.

As hereinbefore described, cover plate 37 is secured to main leg 12 of the first prefabricated section 10. Spaced ribs 45 are welded or otherwise secured to main leg 12 and extend radially outwardly therefrom, each of the ribs 45 resting upon the upper surface of flange 14 and the upper surface of bearing ring 28. An annular ring gear guide member 46 extends around main leg 12 and is positioned between the upper surface of spaced ribs 45 and the lower surface of cover plate 37. A ring gear bearing plate 48 is secured to the upper edge of each of the ribs 45 adjacent the outer periphery of ring gear guide member 46, as illustrated in FIG. 3, for supporting a ring gear 50. Gear retainer members 52 are spaced about the outer periphery of ring gear guide member 46 to limit upward movement of ring gear 50.

Figure 2:
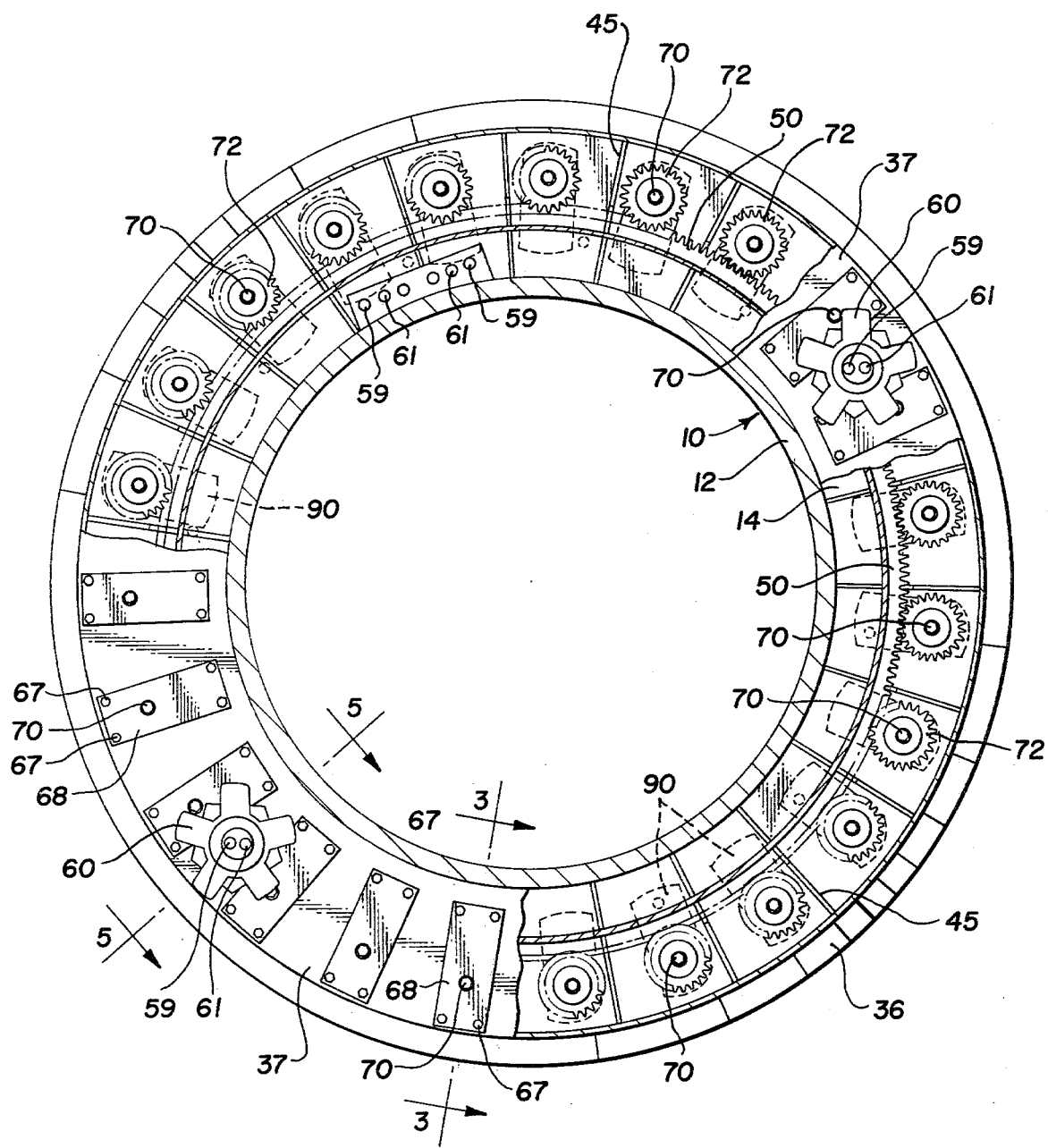
FIG. 2 is a cross-sectional view taken along line 2—2 of FIG. 1 of the drawing, parts being broken away to more clearly illustrate details of construction.
Figure 5:
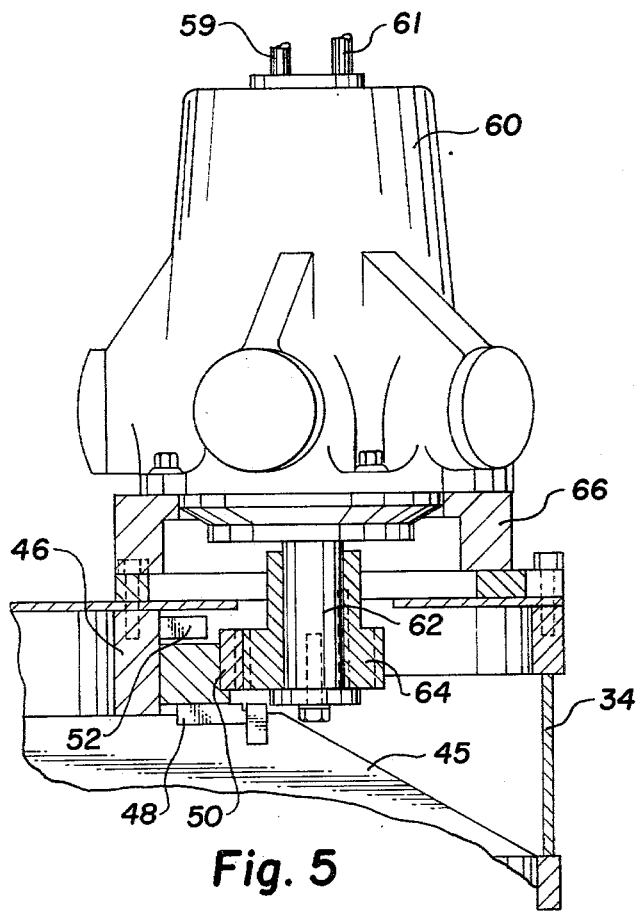
FIG. 5 is an enlarged cross-sectional view taken along line 5—5 of FIG. 2.

As best illustrated in FIGS. 1, 2 and 5 of the drawing, a plurality of hydraulically driven motors 60 having a drive shaft 62 and pinion gear 64 secured thereto are connected by mounting member 66 bolted or otherwise secured to cover openings formed in cover plate 37.

Hydraulically driven drive motors 60 are connected by hydraulic lines 59 and 61 to a suitable source of pressurized hydraulic fluid (not shown) preferably positioned on a barge or other vessel floating on the surface of the water. It should be readily apparent that when hydraulic fluid is delivered through hydraulic line 59, motor 60 and hydraulic line 61, the drive shaft 62 of motor 60 will rotate thereby imparting motion through pinion gear 64 to the ring gear 50 thereby causing ring gear 50 to move along ring gear bearing plates 48 and to rotate about ring gear guide member 46.

As best illustrated in FIGS. 1, 2 and 3 of the drawing, a plurality of vertically extending shafts 70 are spaced about the periphery of ring gear 50 and each of the shafts 70 has a pinion gear 72 associated therewith in meshing relation with ring gear 50. It should be readily apparent that rotation of ring gear 50 imparts rotation to each of the pinion gears 72, as will be hereinafter more fully explained.

As best illustrated in FIG. 3 of the drawing, each pinion gear 72 is connected by a key 73 to a hub 74 on a torque limiting clutch 75. The upper end of shaft 70 extends through hub 74, the torque limiting clutch 75 being of conventional design and adapted such that torque applied for rotating pinion gear 72 is transmitted through clutch 75 for rotating shaft 70 until a predetermined maximum torque is reached, at which time the clutch slips to thereby terminate rotation of shaft 70.

Shaft 70 has a shoulder 76 formed thereon which is supported by a bronze bushing 78 in a bearing sleeve 79 positioned in an aperture formed in bearing ring 28. The upper end 70a of shaft 70 extends through an opening formed in shaft support plate 68 which is secured by bolts 67 to the structure 15.

The lower end 70b of shaft 70 has screw threads formed on the outer surface thereof and a socket 82 formed therein. A bearing pin 84 is welded or otherwise secured to the upper surface of stiffener ring 40 and extends into the socket 82 for rotatably securing the externally threaded end 70b of shaft 70 to stiffener ring 40.

As best illustrated in FIGS. 1, 2, 3 and 4 of the drawing, each shaft 70 has an internally threaded clamp dog 90 secured to the lower end thereof.

The general shape and configuration of clamp dog 90 is illustrated in FIGS. 3 and 4 of the drawing. It will be appreciated that clamp 90 has a substantially flat upper surface 92 which is moveable into engagement with the lower surface 21 on flange 20 secured to leg 18 of the second prefabricated section of the platform support structure 16. As hereinbefore noted, clamp dog 90 has an internally threaded aperture 94 through which the externally threaded lower end 70b of shaft 70 extends.

An anchor member 96 is secured to each ring gussett 38 for supporting one end of coil spring 95 positioned about the central section of shaft 70. The opposite end of coil spring 95 has a downwardly deflected portion 97 which engages a side of dog 90 to resiliently urge dog 90 from the position illustrated in dashed outline in FIG. 4 of the drawing to the position illustrated in full outline.

As hereinbefore pointed out, anti-rotation stops 42 are secured to the upper surface of stiffener ring 40, as illustrated in FIGS. 3 and 4 of the drawing. Dog 90 has an outwardly extending shoulder 98 formed on one corner thereof positioned to engage anti-rotation stop member 42 when the clamp dog is in the retracted position illustrated in dashed outline in FIG. 4 of the drawing and when the clamp dog is in its lower most position.

When the clamp dog 90 is in its lower most position, rotation of externally threaded shaft 70 causes clamp dog 90 to move longitudinally or vertically as illustrated in FIG. 3 of the drawing until the lower end 98a of shoulder 98 moves to an elevation above the upper surface 42a of anti-rotation stop member 42. When the lower end of shoulder 98a clears the upper surface 42a, spring 95 causes stop dog 90 to rotate from the dashed outline position shown in FIG. 4 of the drawing to the full outline position as shown in FIGS. 3 and 4 thereby positioning the upper surface 92 of clamp dog 90 below flange 20. After the dog 90 has rotated through an angle of approximately 90 degrees to the position illustrated in full outline in FIG. 4, the dog is engaged by a stop member 100 which is welded or otherwise secured to the upper surface of stiffener ring 40. Thus, continued rotation of shaft 70 causes dog 90 to move upwardly or longitudinally along shaft 70 until the upper surface 92 on dog 90 engages the lower surface 21 on flange 20.

Since shaft 70 is driven by hydraulic motors 60 through ring gear 50 and torque limiting clutch 75, each of the dogs 90 will be individually tightened to a predetermined torque.

Figure 7:
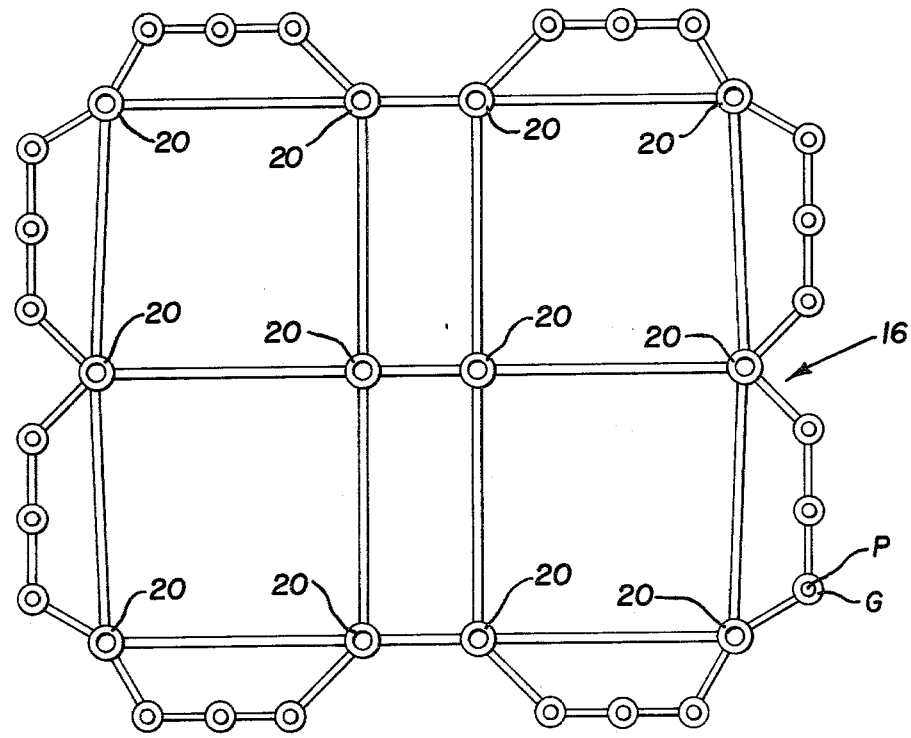
FIG. 7 is a cross-sectional view taken along line 7—7 of FIG. 6.

As best illustrated in FIGS. 6 and 7, the second prefabricated support structure 16 has a plurality of main support legs 18 each having a flange 20 secured to the upper end thereof. The second prefabricated support structure 16 has a plurality of piling guides G adapted to receive pilings P to secure the support structure 16 to the ocean floor. At best the ocean floor is usually uneven, flanges 20 may not lie in a single plane.

The first prefabricated support structure 10 has a plurality of main legs 12 each having a female connector portion 15 secured to the lower end thereof adapted to engage flanges 20 of the second prefabricated support structure 16. The female connector portion 15 is adapted to allow independent connection of legs 12 to legs 18 even if the flanges 20 do not lie in the same plane.

It should be readily apparent that in lieu of the drive motor 60 and torque limiting clutch 75 that one could employ separate hydraulic motors or cylinders for moving clamp dogs 90 independently into engagement with surface 21 of flange 20, if it were deemed expedient to do so.

Further, ring gear 50 could be replaced by a chain or cable mounted on sprockets or pulleys adapted to rotate shafts 70 and clutches 75. Furthermore, a transmission system of universal joints and couplings may be used to drive shafts 70.

The operation and function of the apparatus hereinbefore described should be readily apparent from the foregoing description. However, it should be noted that if a drilling platform support structure has four main legs, four of the clamping devices of the type hereinbefore described will be employed, one on each leg.

Prior to lowering prefabricated section 10 into a position above the prefabricated section 16, clamp dogs 90 are moved to the retracted position shown in dashed outline in FIG. 4 of the drawing and each shaft 70 is rotated to move each dog 90 to its lower most position.

After prefabricated section 10 has been lowered to a position wherein flange 20 is received in the socket portion 32 of the female connector portion 15, pressurized hydraulic fluid is delivered to each of the motors 60 for unlocking each dog 90, as hereinbefore described, rotating each dog to its extended position under flange 20, and then elevating dog 90 to the position shown in FIG. 3 of the drawing thereby locking the first and second prefabricated sections of the support structure together.

From the foregoing it should be readily apparent that the flange connector which we have devised accomplishes the objects of the invention hereinbefore discussed.

It should be appreciated that other and further embodiments of our invention may be devised without departing from the basic concept thereof.

Having described our invention, we claim:

1. A connector for securing a first member to a second member, each of said first and second members having a flange or other similar structure on the end thereof, the connector comprising: an actuation means having a driven shaft; a pinion drive gear on said driven shaft; means securing said actuation means to the first member; a ring gear; ring gear guide means on said first member; means movably securing said ring gear to said ring gear guide means such that the ring gear is in meshing relation with said pinion drive gear; a torque limiting means; a driven gear drivingly connected to said torque limiting means; means urging said driven gear into driving relation with said ring gear; a drive shaft; means rotatably securing said drive shaft to the flange on the first member; means drivingly connecting said torque limiting means to said drive shaft; clamp means; means movably securing said clamp means to the flange on the first member; and interengaging means on said drive shaft and on said clamping means to move said clamping means relative to the flanges on the first and second members.

2. A platform support structure comprising; first and second prefabricated support structure sections; a plurality of legs on each of said prefabricated support structure sections, said legs on said first section being arranged to be positioned adjacent said legs on said second section; connector means secured to the lower end of each leg on said first section and secured to the upper end of each leg on said second section; a pair of clamping surfaces in each of said connector means; a motor secured to each leg on said first prefabricated section; a driven shaft on said motor; a pinion drive gear on said driven shaft; a ring gear movably secured to the leg on the first prefabricated section such that the ring gear is in meshing relation with said pinion drive gear; a torque limiting clutch having a drive gear drivingly connected thereto; means urging the clutch drive gear into driving relation with said ring gear; a drive shaft rotatably secured to a flange on the leg of the first prefabricated section and drivingly connected to said torque limiting clutch; an interengaging means on said drive shaft and on a plurality of clamping elements movably secured to the legs on the first prefabricated section to move said clamping element relative to flanges on legs of the first and second prefabricated support structure sections.

3. An improved connector construction for actuation to connect mating structural elements such as flanges on prefabricated sections on offshore drilling platform support structure, the connector comprising: clamp means rotatably secured to a first of the prefabricated sections and being movable from a first retracted position substantially tangent to a flange on a second of said prefabricated sections to a second extended position substantially parallel to a radius of the flange on the second prefabricated section; drive means adapted to rotate said clamp means from said first position toward said second position secured to the first prefabricated section; means drivingly connecting said drive means to said clamp means; means for resiliently urging said clamp means toward said second position; means mounted on said first prefabricated section for preventing rotational movement of said clamp means until said clamp means have moved a predetermined distance longitudinally of a shaft used in rotatably securing the clamp means to the first prefabricated section; and remote control means to energize said drive means.

4. A connector according to claim 3, including a bearing ring secured to said first prefabricated section and an externally threaded drive shaft rotatably secured to said bearing ring for threadedly engaging an internally threaded passage formed in said clamp means for rotatably securing the clamp means to the first prefabricated section.

5. A connector according to claim 4, with the addition of means resiliently urging said clamp means toward said second position; and means mounted on said first prefabricated section for preventing rotational movement of said clamp means until said clamp means has moved a predetermined distance longitudinally of the shaft used in rotatably securing the clamp means to the first prefabricated section.

6. An improved connector construction for actuation to connect mating structural elements such as flanges on prefabricated sections of an offshore drilling platform support structure, said connector comprising: clamp means rotatably secured to a first of the prefabricated sections for movement from a first retracted position substantially tangent to the flange on a second of the prefabricated sections to a second extended position substantially parallel to a radius of the flange on the second prefabricated section; drive means adapted to rotate said clamp means from said first position toward said second position secured to the first prefabricated section; means drivingly connecting said drive means to said clamp means including a torque limiting device secured to a shaft used to rotatably secure the clamp means to the first prefabricated section; means drivingly connecting said torque limiting device to said drive means; and remote control means to energize said drive means.

7. A connector according to claim 6, including: a bearing ring secured to said first prefabricated section and an externally threaded drive shaft rotatably secured to said bearing ring for threadedly engaging an internally threaded passage formed in said clamp means to rotatably secure the clamp means to the first prefabricated section.

* * * * *